United States Patent

[11] 3,599,870

| [72] | Inventors | Warren H. Brackbill<br>Paradise;<br>Ernest E. Buck, New Holland, both of, Pa. |
|---|---|---|
| [21] | Appl. No. | 863,458 |
| [22] | Filed | Oct. 3, 1969 |
| [45] | Patented | Aug. 17, 1971 |
| [73] | Assignee | Sperry Rand Corporation<br>New Holland, Pa. |

[54] LIQUID MANURE RETAINER
8 Claims, 3 Drawing Figs.

[52] U.S. Cl. .................................................. 239/220,
239/658, 239/662
[51] Int. Cl. ........................................................ F23d 11/04
[50] Field of Search ........................................... 239/658,
660, 662, 663, 666, 220, 221; 296/14, 36

[56] References Cited
UNITED STATES PATENTS

| 3,211,461 | 10/1965 | Elwick ......................... | 239/658 |
| 3,392,922 | 7/1968 | Lindgren ..................... | 239/658 |

*Primary Examiner*—M. Henson Wood, Jr.
*Assistant Examiner*—Thomas C. Culp, Jr.
*Attorneys*—Joseph A. Brown, John C. Thompson, James J. Kennedy and George C. Bower

ABSTRACT: A material-retaining device for a tank-type manure spreader for preventing fluid or semifluid material from slopping over the edges of the tank during transport.

PATENTED AUG 17 1971 3,599,870
INVENTORS
WARREN H. BRACKBILL
ERNEST E. BUCK
BY
James J. Kennedy
ATTORNEY
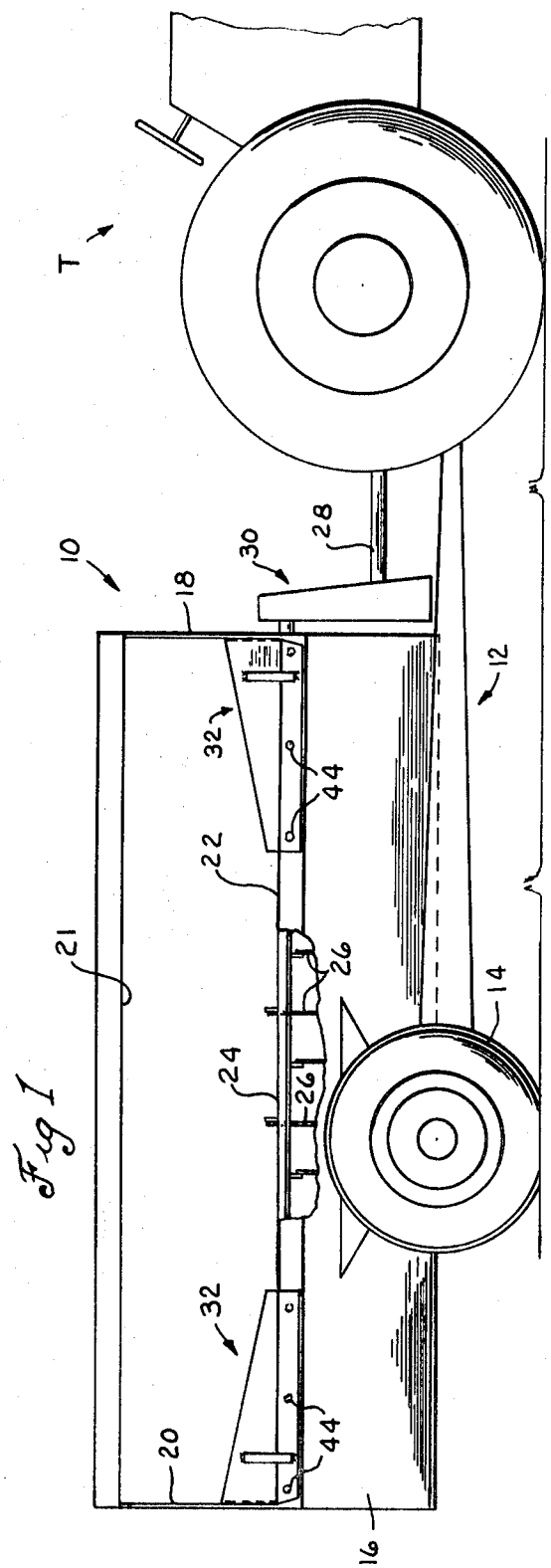
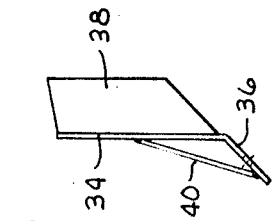
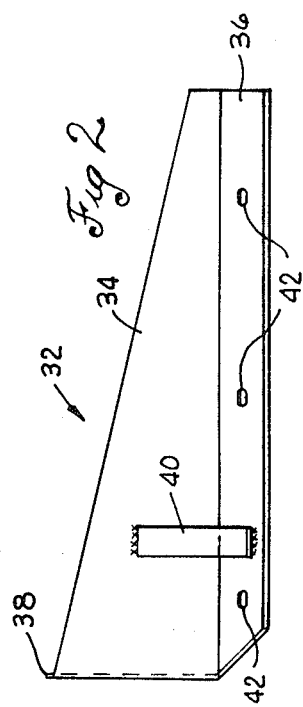

3,599,870

LIQUID MANURE RETAINER

BACKGROUND OF THE INVENTION

Tank-type manure spreaders have been gaining considerable acceptance with farmers all across the country. Many dairy farmers are finding that it is much easier to dispose of their daily manure-hauling tasks by keeping the manure in a fluid or semifluid state in storage pits located under or adjacent the barn areas until such time as he is free to transport the material to the desired discharge point. Using this type of system, it is not necessary to haul and spread manure on a daily basis.

The fluid or semifluid state of the manure has caused the farm equipment industry to change from the conventional manure spreader designs, which were unable to retain the slurry material in enough volume to make that type of spreader applicable, to the tank-type system using a pump, gravity, or flail means to discharge the material from the spreader. Because of the semifluid state of the material, however, the material tends to slop in the spreader while it is being transported to its discharge location. In several instances, the states have legislated against such spillage, imposing fines on owners and operators of such spreaders when they are convicted of spilling the manure material on streets and highways of these various states. Irrespective of the legal problems involved, this spillage, if permitted to continue uncorrected, causes a serious reduction on the volume of the material being hauled, in addition to the fact that it causes rather unsightly and unsanitary deposits of material along roads.

The slopping is particularly liable to occur as the spreader moves up and down a grade or comes to a stop sign at a street intersection. The sudden change of momentum of the device causes the fluid or semifluid material to slop up against the tank container end walls so that material splashes from the end walls over the side through the discharge opening.

It has been found necessary then, to find some way preventing the slopping or spilling of material from the spreader along roadways while at the same time permitting substantially uninterrupted discharge of the material at the desired area.

SUMMARY OF THE INVENTION

The primary object of this invention is, therefore, to provide a liquid manure-retaining device which will alleviate the spillage problem during transport of full spreader loads, while at the same time permitting substantially uninterrupted discharge of the material at the desired point.

A further object of this invention is to provide a pair of triangular-shaped retainer panels which are mounted on the container and extend into the discharge opening.

Another object of this invention is to provide a pair of triangular-shaped panels which have a sloping or inclined upper surface which is highest adjacent the end walls and lowest at an intermediate portion of the discharge opening to permit substantially uninterrupted discharge of the material.

These and other objects of this invention will become apparent from the following detailed description of the invention and from the appended claims.

BRIEF DESCRIPTION OF THE DRAWINGS

FIG. 1 is a side elevation of a tank-type spreader constructed in accordance with the present invention.

FIG. 2 is a side elevation of the liquid manure-retaining means.

FIG. 3 is an end view of the liquid-retaining means shown in FIG. 2.

DESCRIPTION OF THE PREFERRED EMBODIMENT

Referring now generally to the figures of the drawing, a tank-type spreader, generally designated by the numeral 10, is comprised of a chassis structure 12, supporting wheels 14 and a generally cylindrical tank 16. The chassis structure 12 is supported on wheels 14 (only one of which is shown) and is adapted to travel over the ground behind a towing vehicle such as a tractor T, as shown in FIG. 1. The cylindrical tank 16 is mounted on the chassis structure 12 and extends in a fore-and-aft direction therealong behind the tractor.

Tank 16 is provided with a front end wall 18 and a rear end wall 20, as shown in FIG. 1. A discharge opening is formed between top edge 21, and lower edge 22 of the cylinder. The side opening extends in a fore-and-aft direction between the front and rear end walls 18 and 20, respectively, and between the upper and lower edges of the tank. A shaft 24 extends longitudinally of tank 16 and is rotatably supported in front and rear end walls 18 and 20, respectively, by any suitable means, not shown. A plurality of flexible flail elements 26 are attached to shaft 24 and are rotatable therewith to contact and discharge material from the spreader.

A forward end of shaft 24 extends through end wall 18. A PTO shaft 28 has a forward portion connected to the PTO output drive of towing vehicle T, while the inner end of the PTO shaft 28 is connected to a power transfer device 30. Power transfer device 30 may be of any suitable type, either a gearbox, a belt drive, or a chain drive mechanism. Any of these drive devices are well known in the art and it is not necessary to go into the details of their construction for the purposes of this application since those details form no part of the present invention.

Retaining means 32 are comprised of a pair of panel members 34 which have a vertical wall portion, an outwardly turned lower flange portion 36, an inwardly turned side flange portion 38 and a stiffener member 40 extending between the vertical panel 34 and lower flange 36. As can be seen by the detailed FIGS. 2 and 3, flange 36 is also provided with a plurality of mounting slots 42 which are spaced to coincide with the existing hardware on the discharge side of this flail-type unit. The triangular-shaped retaining means are then bolted by means of bolts to the upper edge portion 22 of the material container so that the vertical wall portion 34 extends upwardly into and across discharge opening with in turned flange 38 abutting against front and rear sidewalls, as shown in FIG. 1. The top edge of the vertical wall portion is sloped or inclined so that it reaches its maximum height adjacent the front and rear end wall portions 18 and 20, respectively, and its lowest height inwardly of the end walls intermediate the discharge opening. In this manner, the greatest protection is given in the area of the end wall where the maximum of slopping tends to occur so that the materials are retained within the discharge device, while the inclined upper edge terminating at the lower inner end of the device permits substantially uninterrupted discharge of the material from the tank by the rotating flails during the discharge operation.

In operation, the spreading device is filled with fluid or semifluid material to a point about even with shaft 24. The spreader 10 is then hauled to the discharge area by means of tractor T where upon reaching the desired discharge area, PTO shaft 28 is activated causing shaft 24 and flails 26 to rotate contacting the material within the container and flinging it through the discharge opening onto the ground. When the entire wagon has been emptied in this manner, it is then returned again to the loading point where it can be refilled for subsequent transport and discharge. Material that previously tended to slop over the sides and edges of the spreader is now substantially retained by the panel members.

While this invention has been described in connection with a single embodiment thereof, it will be understood that this embodiment is capable of modification and that this application is intended to cover any variations, uses, or adaptations following, in general, the principles of the invention and including such departures from the present disclosure as come within the known or customary practice in the art to which the invention pertains, and as fall within the scope of the invention.

We claim:

1. A side-unloading material-distributing device comprising a wheel supported chassis structure; a generally cylindrical material container mounted on said chassis and extending in a fore-and-aft direction between front and rear end walls; a discharge opening formed in a sidewall of said container, said opening extending longitudinally between said end walls; a rotatable shaft extending longitudinally of said container; a plurality of flexible flail elements carried by said shaft in spaced-apart relation, said flail elements being rotatable with said shaft to contact material in said container and discharge it through said opening; and material retaining means including a pair of plate members adapted to be positioned so as to occupy the lower outside areas of said discharge opening, thereby tending to reduce manure spillage from these areas of said discharge opening, said spillage being occasioned by back and forth slushing of the manure against said end walls during transport.

2. An improved side-unloading material-distributing device, as recited in claim 1, wherein said pair of plate members include a lower edge fixed to said container and an upper edge being inclined, said members being so disposed that the lowest portion of said incline is spaced away from said end walls.

3. An improved side-unloading material-distributing device, as recited in claim 1, wherein said members are fixed to said container adjacent said end walls.

4. A side-unloading material-distributing device comprising a wheel supported chassis structure; a generally cylindrical material container mounted on said chassis and extending in a fore-and-aft direction between front and rear end walls; a discharge opening formed in a sidewall of said container, said opening extending longitudinally between said end walls; a rotatable shaft extending longitudinally within said container; a plurality of flexible flail elements carried by said shaft in spaced-apart relation, said flail elements being rotatable with said shaft to contact material in said container and discharge it through said opening; and material-retaining means including a pair of plate structures, each being detachably mounted to said container and extending upwardly through said discharge opening adjacent an end wall, thereby covering the lower outside areas of said discharge opening and tending to reduce manure spillage resulting from back and forth slushing against said end walls.

5. A tank-type manure spreader comprising a wheel supported chassis structure; a generally semicylindrical container mounted on said chassis and including first and second upwardly extending sidewalls and a pair of end walls fixed to opposite ends thereof, said first sidewall having an upper terminal edge; an axially extending rotatable shaft journaled within said end wall; a plurality of spaced-apart flexible flail elements carried with said shaft and rotatable therewith for engagement with manure contained within said container; a curved shaped spreading shield integrally formed with said second sidewall and extending upwardly over the open portion of said semicylindrical container, said spreading shield having a terminal edge terminating in spaced-apart relationship relative to the upper edge of said first wall, thereby forming a side discharge opening, whereby manure being engaged by said flail elements may pass therethrough for distribution onto the ground; and a pair of retaining plates each being detachably mounted about their lower edge to said upper terminal edge of said first sidewall about an end section thereof such that each of said retaining plates extend upwardly through said discharge opening adjacent said end walls, thereby tending to reduce manure spillage occasioned by the back and forth slushing of manure against said end walls induced by speed changes of the spreader.

6. A tank-type manure spreader as recited in claim 5 wherein the upper edge of each of said plates is inclined such that when disposed within said discharge opening the highest portion of said upper edge is adjacent an end wall and the lowest portion of said incline is spaced away from said end wall.

7. In a manure spreader comprising a wheel supported chassis structure, a generally semicylindrical container mounted on said chassis and including first and second upwardly extending sidewalls and a pair of end walls fixed to opposite ends thereof, said first sidewall having an upper terminal edge, an axially extending rotatable shaft journaled within said end walls, a plurality of spaced-apart flexible flail elements carried by said shaft and rotatable therewith for engagement with manure contained within said container, a curved shaped spreading shield integrally formed with said second sidewall and extending upwardly over the open portion of said semicylindrical container, said spreading shield having a terminal edge terminating in spaced-apart relationship relative to the upper edge of said first sidewall, thereby forming a partial enclosure with a side discharge opening, whereby manure being engaged by said flail elements may pass therethrough for distribution onto the ground, the improvement comprising: the selective shaping of the upper terminal edge of said first sidewall such that the end portions of said first sidewall immediately adjacent each of said end walls extends upwardly substantially above the level of the intermediate portion of said first sidewall, thereby tending to reduce manure spillage over the end extremities of said first sidewall as a result of the manure slushing back and forth against said end walls as the manure spreader is starting, stopping or suddenly changing speeds.

8. A manure spreader as recited in claim 7 wherein the end portions of said upper terminal edge of said first sidewall are inclined downwardly to two intermediate points on said terminal edge of said first sidewall and wherein the terminal edge between said intermediate points extends in a general straight line.